Feb. 16, 1954   R. SHERR   2,669,710
AIRCRAFT VELOCITY INDICATING PULSE ECHO SYSTEM
Filed Oct. 26, 1945

INVENTOR.
RUBBY SHERR
BY
William D. Hall.
ATTORNEY

Patented Feb. 16, 1954

2,669,710

UNITED STATES PATENT OFFICE 2,669,710

AIRCRAFT VELOCITY INDICATING PULSE ECHO SYSTEM

Rubby Sherr, Santa Fe, N. Mex., assignor, by mesne assignments, to the United States of America as represented by the Secretary of War Application October 26, 1945, Serial No. 624,905

3 Claims. (Cl. 343—8)

The present invention relates to a radio object locating system, and it relates more particularly to an airborne system of this type which is adapted also to determine the speed of the aircraft relative to the ground.

Conventional radio object-locating systems are characterized by the transmission of short duration, high carrier-frequency, exploratory pulses of radiant energy that upon striking an object return as echo-pulses to provide information pertaining to the location of the object relative to the transmitter. In systems of the conventional type, information relating to the velocity of the object is not easily obtained, and echo-pulses from fixed and moving objects are not readily distinguished from one another.

Various methods have been devised for providing velocity information, these methods all being based upon some method for obtaining reference oscillations synchronized in fixed phase relation with the carrier wave transmitted exploratory pulses, determining the phase of the returned echo-pulse carrier-wave relative to the phase of the reference oscillations, and presenting this information either visually or aurally as evidence of a moving object.

If the velocity of the object is constant, then as the object moves, the relative phase between the carrier oscillations of the echo-pulses and the reference oscillations has an equal change from pulse to pulse. This progressive change in phase may be manifested by video pulses having a cyclical variation in amplitude, the rate of cyclical variation being a function of object velocity. The video pulses are obtained by algebraically combining the echo-pulses and the reference oscillations, and detecting the resulting combination. The echo-pulses alternately reinforce and oppose the reference oscillations, said reinforcing or opposing action being dependent upon the relative phase between the two.

In general, two methods may be employed to obtain the necessary reference oscillations synchronized in fixed phase relation with the carrier wave transmitted exploratory pulses. The first method consists in using continuous wave or interrupted continuous wave reference oscillations generated locally at the receiver, and locked in synchronism (in coherence) with the exploratory pulses. The second method makes use of the fact that the carrier wave of each echo-pulse returning from a fixed object has a substantially constant phase relation with respect to the carrier wave of its respective exploratory pulse, and hence, meets the criterion for reference oscillations. Systems using the first mentioned method are now widely known as coherent pulse-echo systems, whereas systems employing the last-mentioned method may be referred to as non-coherent pulse-echo systems.

The frequency of the modulation envelope of a plurality of video pulses obtained by detecting the algebraic combination of echo pulses and reference oscillations, is proportional to the rate of echo-pulse carrier wave phase shift relative to the reference oscillations and hence provides a measure of object velocity. The frequency of said modulation envelope is given by the expression (1)
$$\Delta f = \frac{2v}{c} f^1$$

wherein $\Delta f$ is the frequency of the modulation envelope, $c$ is the velocity of electromagnetic waves in space, $v$ is the velocity of the object relative to the exploratory-pulse transmitter and $f^1$ is the frequency of the reference oscillations, which in the present invention may be the carrier frequency of the exploratory pulses. From this expression it is evident that the frequency of the modulation envelope is a direct function of the object-velocity and as a result radio object-location systems of this nature may provide object-velocity information.

It is an object of the present invention to provide a method whereby the speed of an aircraft relative to the ground (ground speed) may be determined in a simple and reliable manner.

It is also an object of the present invention to provide a radio object-locating system of the non-coherent pulse-echo type adapted to determine the ground speed of an aircraft.

It is a still further object of the present invention to provide a simple and reliable apparatus, to accomplish the above objects, and of suitable weight and compactness to be mounted in an aircraft.

The above and further objects and advantages will appear more fully in connection with the following description and accompanying drawings wherein.

Figure 1:
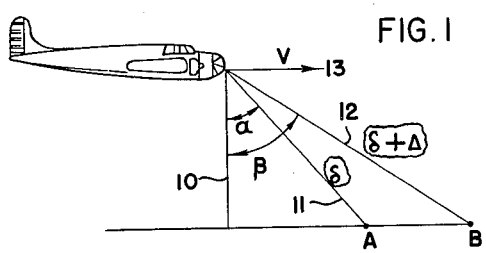
Fig. 1 shows the geometry useful for better understanding of the system.

Reference is made to Fig. 1, which shows the geometry of the system wherein A is a point on the ground a distance from the aircraft, and B is a second point on the ground at a greater distance from the aircraft. In Fig. 1 the angle $\alpha$ is the angle formed by the intersection of an imaginary line 10 representing the altitude of the aircraft and of an imaginary line 11 representing the slant range of the aircraft from point A. Angle $\beta$ is similarly formed by the intersection of the imaginary altitude line 10, and the imaginary line 12 representing slant range of the aircraft from point B. As the aircraft has a velocity $v$ relative to the ground, and in a longitudinal direction as represented by the vector 13 in Fig. 1, the aircraft will approach points A and B at different rates, said rates being respectively $v \sin \alpha$ and $v \sin \beta$.

The rate of change of phase of the carrier wave of the echo-pulses from B relative to the phase of the carrier wave of the pulses from A is (2)
$$\Delta f_{BA} = \frac{2v}{c} f^1 (\sin \beta - \sin \alpha)$$

Upon inspection of this expression it is seen that $\Delta f_{BA}$ is a function of the speed of the aircraft relative to the ground and it merely remains to obtain a physical manifestation of $\Delta f_{BA}$.

In view of the foregoing it will be apparent that if there is a phase change of the echo-pulses from B relative to the echo-pulses from A it is not necessary to generate reference oscillations locally at the aircraft. According to this invention, the echo-pulses from A may be used as such. The use of the echo-pulses from A as reference oscillations is contingent upon said echo-pulses having a fixed phase relation with respect to the transmitted exploratory pulses. In order to compare the phase of the pulses, from B to the phase of the pulses from A to obtain velocity information, it is further necessary, that for a constant aircraft speed, successive echo-pulses from B have a constant increment of phase shift with respect to the phase of the echo-pulses from A. Both conditions are met only if points A and B can act for a short period of time as fixed objects.

In actual operation points A and B are contained in small areas having a predetermined relation with respect to the aircraft such that the angles $\alpha$ and $\beta$ remain substantially constant as the aircraft moves.

It is apparent from the geometry of Fig. 1 that for the angles $\alpha$ and $\beta$ to remain substantially constant as the aircraft moves in the direction indicated by the velocity vector 13, the patches of ground including points A and B must continuously change, and in actuality A and B are points in successive patches of ground. New patches of ground are continuously selected in such a manner that each succeeding patch of ground contains a portion of the preceding patch. (In effect the patch of ground is continuously "moving.") It will be hereinafter shown how the points A and B in said selected patches of ground may act for a certain length of time as fixed objects in accordance with the stated requirements.

A convenient way of thinking about these patches of ground is to associate with each, a single point arbitrarily called the optical center. It is known that radiant energy upon striking a surface will reflect energy back to the transmitting antenna. As each point in the surface (patch of ground) is at a slightly different distance from the antenna, the phase of the reflected energy will vary from point to point and each portion of energy may be represented by an individual vector, the sum of the individual vectors combining to produce a resultant vector that will correspond to energy received from a single point. This imaginary point may be referred to as the optical center and consequently points A and B may be considered the optical centers of respective patches of ground surrounding said points.

For heterogeneous ground which contains a number of prominent objects, such as buildings, each successive patch of ground may have a prominent object. The resultant vector representing the energy returning from this patch of ground is equal to the sum of the vectors from all points in the patch of ground including that from the prominent object, the latter vector having a much greater magnitude than any one of the others. As new patches of ground are selected new points will be encompassed by the patch and old ones will be eliminated (in effect the patch of ground is continuously "moving"). In consequence new vectors will be added and old ones will drop out, but as these represent energy essentially from non-prominent objects, their magnitude will be small as compared to the magnitude of the vector from the prominent object and hence the phase and magnitude of the resultant vector relative to the transmitted exploratory pulse will remain substantially unchanged.

The result is, that in substance, the prominent object acts as the optical center of the patch of ground and said optical center remains virtually motionless for the period of time that a prominent object first appears in a selected patch of ground until it disappears from successive selected patches. In other words, it acts as a fixed object for a short interval and when a prominent object is included or excluded in successive selected patches of ground (i. e., it "enters" or "leaves" the "moving" patch) the optical center will suddenly shift toward or away from said object but at other times will remain substantially motionless. In general ordinary ground will have reflecting characteristics that will satisfy the requirements of the system.

As the carrier wave of the echo-pulses returning from both A and B has a fixed phase with respect to the transmitted exploratory pulses, the character of the pulses from A fulfills the requirements that are necessary for their use as reference oscillations.

Furthermore, as shown in Fig. 1, the distance from the aircraft to A is less than the distance from the aircraft to B. Therefore, the echo-pulses from A will return before those from B. To properly combine the respective echo-pulses, it is therefore necessary to delay the echo-pulses from A for a period of time equal to the additional time it takes the pulses to return to the aircraft from B. The delayed pulses from A and the pulses from B may then be algebraically combined at the aircraft and they will reinforce or oppose one another depending upon the relative phase of their respective carrier waves. The combination obtained by algebraically combining these pulses may be detected to provide video pulses.

By making the points A and B a fixed distance apart, the interval of time delay, which for the sake of clarity and brevity is hereinafter referred to as $\Delta$ is constant. The time taken for the echo-pulses to return to the aircraft from A is proportional to the slant range from A and may be hereinafter represented by the symbol $\delta$, similarly the time for echo-pulses to return to the aircraft from B is proportional to the slant range from B and may be hereinafter represented by the expression $(\delta+\Delta)$.

Providing the expression $(\sin \beta - \sin \alpha)$ in expression (2) is constant, the frequency of the modulation envelope of a plurality of the above described video pluses, denoted by $\Delta f_{BA}$ in said expression, is a direct function of object velocity. Inasmuch as the modulation envelope is defined by plurality of video pulses, it is necessary that there be a sufficient number of video pulses to provide a modulation envelope before the angles $\alpha$ and $\beta$ change appreciably.

It is apparent that as A and B act for a short period of time as fixed objects and as the aircraft will move only a few inches between transmitted pulses, a plurality of video pulses having a well defined modulation envelope may be obtained before $(\sin \beta - \sin \alpha)$ changes appreciably.

Upon further examination of expression (2) it is seen that the frequency of the modulation envelope as represented by $\Delta f_{BA}$ is dependent upon the magnitude of the expression $(\sin \beta - \sin \alpha)$. In other words, by making $(\sin \beta - \sin \alpha)$ small $\Delta f_{BA}$ may be made correspondingly small. The magnitude of $(\sin \beta - \sin \alpha)$ is determined by the distance between points A and B; the closer they are together the smaller is the expression $(\sin \beta - \sin \alpha)$ and smaller the delay $(\Delta)$ required. The ability to predetermine the order of $\Delta f_{BA}$ is of advantage in designing the detector circuit that is utilized to obtain the modulation envelope of a plurality of video pulses.

Patches of ground encompassing points A and B may be selected by sensitizing the receiver in the aircraft by means of voltage pulses. The result of such sensitizing voltage pulses, or gates as they are sometimes referred to, is to allow echo-pulses from the respective patches of ground to be passed by the receiver during the intervals the receiver is sensitized. Energy returning from other portions of the ground will not be passed by the receiver as said receiver is rendered inoperative during the time energy returns from such other ground portions.

The time taken for the echo-pulse to return to the aircraft from points A and B respectively as heretofore mentioned is represented by the terms $\delta$ and $\delta+\Delta$ respectively. Inasmuch as the points A and B are optical centers of respective patches of ground and A and B must act for a period of time as fixed objects, it is necessary for the receiver to successively pass energy returned from each entire patch of ground.

One method that may be employed to select the energy from individual patches of ground is to apply all the received energy simultaneously to a mixer and a delay device, these elements being part of the receiver of the system. The output of the delay device comprises received energy, retard a time $\Delta$, which is then applied as a second input to said mixer. Both inputs are algebraically combined in the mixer and an output is provided therefrom only when said mixer is sensitized. Sensitizing is accomplished in this case by a single gate which is applied substantially at the time $\delta+\Delta$ after the time of transmission of the exploratory pulse. The output of said mixer consists of the algebraic sum of the two input waves, one component of this output energy being obtained from a portion of the ground whose optical center B is a distance from the aircraft proportional to $\delta+\Delta$, and a second component consisting of the energy delayed an interval $\Delta$ which is returned from a patch of ground whose optical center A is at a distance from the aircraft proportional to $\delta$.

It is contemplated that the duration of the sensitizing pulse may be varied depending upon the character of the terrain over which the aircraft is flying.

From the geometry of the system and in view of the preceding discussion it is evident that the angles $\alpha$ and $\beta$ are functions of the altitude of the aircraft and the slant range from said aircraft to points A and B respectively. Therefore, as the altitude of the aircraft changes the times at which the sensitizing gates are applied to the receiver (substantially $\delta$ and $\delta+\Delta$) must also change. In consequence $\delta$ is calibrated versus altitude and may be varied accordingly.

Figure 2:
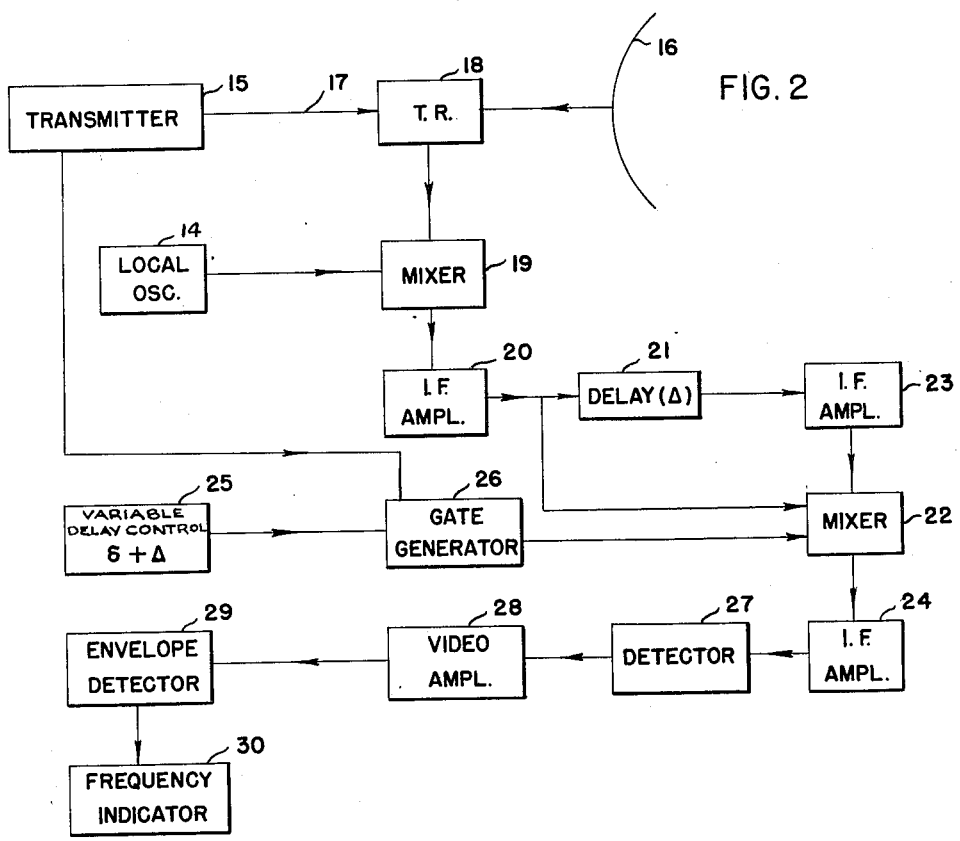
Fig. 2 shows a schematic circuit diagram, in block form, of one embodiment of the present invention.

Referring now to Fig. 2, transmitter 15 comprises a suitable ultra-high frequency generator producing short duration, high carrier-frequency, exploratory pulses of radiant energy. Transmission to antenna system 16 is accomplished by suitable wave guide or transmission line 17 through customary transmit-receive switch 18. As the apparatus represented by the diagram in Fig. 2 is mounted in an aircraft, the major portion of the energy transmitted from said antenna system is directed towards the ground. Transmit-receive switch 18 functions in a normal manner and connects transmitter 15 to antenna system 16 during the transmission of pulses and to disconnect the rest of circuits shown. During the interim between exploratory pulses, and while echo-pulses are being received, the connections are reversed.

Energy reflected from the ground and received by antenna system 16 is fed through TR box 18 to mixer 19, a second input to receiver 19 being continuous wave oscillations generated by local oscillator 14. The beat frequency output of mixer 19 consists of the received energy whose frequency is reduced to an intermediate frequency. This output is then applied to intermediate frequency amplifier 20, the purpose of which is to raise the potential of the received energy to a suitable level. The output from intermediate frequency amplifier 20 is thence simultaneously applied to delay device 21 and mixer 22.

Delay device 21 acts to delay the energy applied thereto a period of time equal to the additional interval of time required for energy to return to the aircraft from point B as compared to the time it takes for the energy to return from point A. In accordance with the foregoing, the amount of delay introduced may be represented as $\Delta$. The output of delay device 21 is then applied to intermediate frequency amplifier 23, the output of which is applied as a second input to mixer 22.

Figure 3:
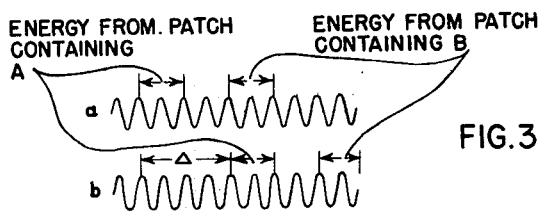
Fig. 3 is a representation of certain of the wave forms which occur in the embodiment of Fig. 2.

Referring for the moment to Fig. 3, which is a diagrammatic representation of certain wave forms occurring in the embodiment of Fig. 2, particular attention is directed to the relative time relations.

Fig. 3a represents a portion of the undelayed echo pulse applied to mixer 22.

Figure 3b represents a similar portion of the delayed echo pulse applied to mixer 22 from intermediate frequency amplifier 23; and Fig. 3c is a representation of the output of mixer 22, obtained by unblocking mixer 22 by the gating pulse from gate generator 26 for the time required to pass the train of oscillations of Fig. 3c.

As heretofore described, the time taken for the energy to return from point B to the aircraft is represented by the symbol δ+Δ where δ is variable depending upon the altitude of the aircraft. Referring once again to Fig. 2, δ+Δ control 25, which may be varied as the altitude changes, is a variable delay control for determining the time when gate generator 26 produces the short-duration sensitizing voltage pulses applied to mixer 22. Gate generator 26 is synchronized by pulses from the transmitter 15. Any variable delay multivibrator, such as disclosed on pages 271 to 274 of Radar System Fundamentals, Navships 900,017, published by the Bureau of Ships, Navy Department, in April 1944, will fulfill the conditions of control 25 and gate generator 26. As is well known in the art, a delay multivibrator includes two electron-tube amplifiers regeneratively connected to each other through a time constant circuit. The tubes are biased so that one tube will normally conduct and the other tube will normally be cut off. The application of an external synchronizing negative pulse to the control electrode of the conducting tube or an external synchronizing positive pulse to the control electrode of the cut-off tube causes a reversal in conduction between the two tubes and at the same time charges the time constant circuit. This circuit then discharges at a rate determined by its time constant. When the potential on the time constant circuit reaches a given magnitude, relative to the bias potentials applied to the tubes, the tubes will again reverse in conduction back to their normal state. Thus a square-wave pulse will be formed which has a duration determined by the time constant of the circuit and the bias potentials applied to the tubes. Voltage sensitizing pulses are obtained in time coincidence with the lagging edge of the square-wave voltage pulses by differentiating and then clipping the latter. In Fig. 2, the external synchronizing pulses are applied to gate generator 26 by transmitter 15, as shown. Variable delay control 25 is used to set the amount of delay between the application of a synchronizing pulse and the production of a voltage sensitizing pulse. This is done by varying either the time constant of said circuit or the bias potentials. Variable delay control 25 is set to provide a delay of δ+Δ, so that the sensitizing voltage pulse will allow an output to be obtained from mixer 22 only at the time δ+Δ as heretofore described. As the two aforementioned inputs to mixer 22 are algebraically combined therein the gated output from said mixer consists of a pulse representing the selected combination of the energy from the patch of ground containing A, and the energy from the patch of ground containing B. This relation will be more fully understood by reference to Fig. 3.

The amplitude of the output from mixer 22 has a periodic variation and the amplitude at any instant will be dependent upon the relative phase of the energy reflected by the patch of ground containing B and the patch of ground containing A respectively. The output from mixer 22 may be applied to intermediate frequency amplifier 24, the output of which is applied to detector 27. Issuing from detector 27 are video pulses which are in effect, the individual envelopes of the input pulses to said detector. The video pulses may thus be amplified by video amplifier 28 and the output thereof applied to envelope detector 29.

Whereas detector 27 provided individual video pulses, envelope detector 29 on the other hand detects the modulation envelope of a plurality of cyclically varying video pulses. It is the frequency of this modulation envelope which is a direct function of the speed of the aircraft relative to the ground. The modulation envelope output of envelope detector 29 is then applied to a frequency indicator 30.

Frequency indicator 30 is calibrated with frequency vs. ground speed and may be of the visual type. One such indicator may consist essentially of a means for transforming the sinusoidal oscillations from envelope detector 29 into pulses occurring at the same frequency. These pulses may then be counted by a convenient pulse counting circuit and evidence of the number of pulses per second presented by means of a dial or meter.

Delay device 21 (Fig. 2) may be any device suitable for delaying the oscillations applied thereto for a short interval of time. At present there are two general types of delay devices, namely electronic and supersonic. It is to be understood, however, that any device capable of performing this operation is suitable for use in the present invention.

While there has been described one embodiment of the present invention, it will be manifest to those skilled in the art that various changes and modifications may be made therein without departing from the invention and it is therefore determined in the appended claims, to cover all such changes and modifications as fall within the spirit and scope of the invention.

I claim:

1. A pulse-echo system for determining the speed of an aircraft relative to the ground including means for locally generating at said aircraft short duration, high carrier-frequency, exploratory pulses of radiant energy, means for directing said exploratory pulses towards the ground at an acute angle relative to the vertical direction, a receiver adapted to pass energy reflected from the ground at predetermined ranges from said aircraft, means for receiving and passing by said receiver energy reflected from the ground at a first predetermined range from said aircraft, means for receiving and passing by said receiver energy reflected from the ground at a range from said aircraft greater than said first-mentioned range, means for delaying the received energy reflected from said ground at said first range for a period of time equal to the additional time required for reflected energy to return to the aircraft from said ground at said second range, means for algebraically combining said delayed reflected energy and the received reflected energy from said ground at said second range, means for detecting said combination to obtain voltage pulses, means for obtaining the modulation envelope of a plurality of voltage pulses, thus to provide an indication of the speed of said aircraft relative to the ground.

2. A pulse-echo system for determining the speed of an aircraft relative to the ground, including means for locally generating at the aircraft short duration, high carrier-frequency, exploratory pulses of radiant energy, means for directing said exploratory pulses towards the ground at an acute angle relative to the vertical direction, a normally inoperative receiver including means for rendering said receiver operative for receiving echo-pulses of radiant energy only from the ground at a first range from said aircraft and means for rendering said receiver operative for receiving echo-pulses of radiant energy only from the ground at a second range which is at a greater range from the aircraft than said first ground at said range, said ground at said first and second ranges respectively having a predetermined angular relation with respect to the longitudinal path of the aircraft, means for determining the relative phase between the carrier waves of the respective echo-pulses reflected from said ground at said first and second ranges respectively, said relative phase changing from pulse to pulse as the aircraft moves, means for determining the rate of change of relative phase of said echo-pulses of radiant energy whereby said rate of change of relative phase provides an indication of the speed of said aircraft relative to the ground.

3. A pulse-echo system for determining the speed of an aircraft relative to the ground including means for locally generating at said aircraft short duration, high carrier-frequency, exploratory pulses of radiant energy, means for directing said exploratory pulses towards the ground at an acute angle relative to the vertical direction, means for receiving energy reflected by the ground, a normally non-operating mixer, a delay device, means for applying said received energy simultaneously as a first input to said mixer, and to said delay device, means for feeding the output of said delay device as a second input to said mixer, means synchronized with said exploratory pulses for generating a sensitizing voltage pulse at a predetermined time after the transmission of each exploratory pulse, said predetermined time being greater than the time delay provided by said delay device, means for applying said sensitizing voltage pulse to said mixer to render said mixer operating only during the presence of said sensitizing voltage pulses, whereby said first input to said mixer represents energy reflected from the ground at a given distance from said aircraft and said second input to said mixer represents energy reflected from the ground at a further distance from said aircraft than said given distance, means in said mixer for algebraically combining the two inputs thereto, the output of said mixer including a pulse of energy having a component of the energy reflected from said ground at said given distance and having a second component including energy reflected from said ground at said second-mentioned distance, a detector for obtaining voltage pulses from said mixer output, means for obtaining the modulation envelope of a plurality of said voltage pulses, and means for indicating the frequency of said modulation envelope to provide an indication of the speed of said aircraft relative to the ground.

RUBBY SHERR.

References Cited in the file of this patent
UNITED STATES PATENTS

| Number | Name | Date |
| --- | --- | --- |
| 2,193,361 | Rice | Mar. 12, 1940 |
| 2,402,464 | Suter | June 18, 1946 |
| 2,403,625 | Wolff | July 9, 1946 |
| 2,422,064 | Anderson et al. | June 10, 1947 |
| 2,450,945 | Eaton | Oct. 12, 1948 |
| 2,455,639 | Anderson | Dec. 7, 1948 |
| 2,467,670 | Hershberger | Apr. 19, 1949 |
| 2,502,464 | Lehmann | Apr. 4, 1950 |
| 2,524,610 | Storm et al. | Oct. 3, 1950 |